(12) United States Patent
Lee et al.

(10) Patent No.: US 8,760,390 B2
(45) Date of Patent: *Jun. 24, 2014

(54) INTERACTIVE DEVICE CAPABLE OF IMPROVING IMAGE PROCESSING

(75) Inventors: Hsuan-Hsien Lee, Hsin-Chu (TW);
Chin-Hsin Yang, Hsin-Chu (TW);
Tzu-Yi Chao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 202 days.

This patent is subject to a terminal disclaimer.

(21) Appl. No.: 12/727,262

(22) Filed: Mar. 19, 2010

(65) Prior Publication Data

US 2010/0177209 A1 Jul. 15, 2010

Related U.S. Application Data

(63) Continuation of application No. 10/904,301, filed on Nov. 3, 2004, now Pat. No. 8,072,426.

(30) Foreign Application Priority Data

Aug. 11, 2004 (TW) .............................. 093124089 A

(51) Int. Cl.
*G09G 5/00* (2006.01)

(52) U.S. Cl.
USPC ........... 345/156; 345/175; 345/179; 345/157; 345/158; 345/163; 178/18.09; 178/19.05; 250/208.2; 250/227.13; 250/221; 463/37; 463/38

(58) Field of Classification Search
USPC ......... 345/157, 166, 156, 175, 179, 158, 163, 345/169, 856; 178/18.09–19.05; 250/208.2, 250/221, 288; 463/37–38
See application file for complete search history.

(56) References Cited

U.S. PATENT DOCUMENTS

| | | | |
|---|---|---|---|
| 5,619,281 A * | 4/1997 | Jung | 348/699 |
| 5,742,294 A | 4/1998 | Watanabe | |
| 5,897,663 A | 4/1999 | Stancil | |
| 5,956,415 A | 9/1999 | McCalley | |
| 6,256,016 B1 | 7/2001 | Piot | |
| 6,580,415 B1 | 6/2003 | Kato | |
| 6,728,395 B1 * | 4/2004 | Kage et al. | 382/107 |
| 6,804,030 B1 | 10/2004 | Walmsley | |
| 6,859,199 B2 * | 2/2005 | Shi | 345/166 |
| 6,924,787 B2 | 8/2005 | Kramer | |
| 7,042,439 B2 * | 5/2006 | Luo | 345/157 |
| 7,085,408 B1 | 8/2006 | Jim | |

(Continued)

FOREIGN PATENT DOCUMENTS

| CN | 1164076 A | 11/1997 |
|---|---|---|
| CN | 1152296 C | 6/2004 |

(Continued)

*Primary Examiner* — Shaheda Abdin
(74) *Attorney, Agent, or Firm* — Winston Hsu; Scott Margo

(57) ABSTRACT

An interactive device for improving image processing. The interactive device includes a processing module and a controller. The processing module includes a substrate, an image sensor formed on the substrate for generating a plurality of pixel signals, a calculation unit formed on the substrate for calculating at least one motion vector based on the plurality of pixel signals, and a transmission interface formed on the substrate for serially outputting the motion vector. The controller is used for controlling operation of the interactive device based on the motion vector output by the transmission interface.

6 Claims, 3 Drawing Sheets

(56) References Cited

U.S. PATENT DOCUMENTS

| | | | |
|---|---|---|---|
| 7,085,418 B2 * | 8/2006 | Kaneko et al. | 382/219 |
| 7,102,615 B2 | 9/2006 | Marks | |
| 7,170,494 B2 * | 1/2007 | Park et al. | 345/166 |
| 7,242,391 B2 * | 7/2007 | Lin et al. | 345/166 |
| 7,417,623 B2 * | 8/2008 | Lin et al. | 345/166 |
| 7,633,489 B2 * | 12/2009 | Lee et al. | 345/166 |
| 7,796,116 B2 | 9/2010 | Salsman | |
| 7,796,120 B2 * | 9/2010 | Chou | 345/166 |
| 7,852,317 B2 | 12/2010 | Grunnet-Jepsen | |
| 7,864,159 B2 | 1/2011 | Sweetser | |
| 2003/0085878 A1 | 5/2003 | Luo | |
| 2003/0193529 A1 | 10/2003 | Lee | |
| 2003/0193561 A1 | 10/2003 | Tecchiolli | |
| 2004/0017473 A1 | 1/2004 | Marks | |
| 2005/0071499 A1 | 3/2005 | Batra | |
| 2008/0278445 A1 | 11/2008 | Sweetser | |
| 2010/0220210 A1 | 9/2010 | Chen | |
| 2011/0095980 A1 | 4/2011 | Sweetser | |

FOREIGN PATENT DOCUMENTS

| | | |
|---|---|---|
| CN | 100559334 C | 11/2009 |
| JP | H08125935 A | 5/1996 |
| JP | H10224696 A | 8/1998 |
| JP | 2001141981 A | 5/2001 |
| JP | 2001242780 A | 9/2001 |
| JP | 2002101332 A | 4/2002 |
| JP | 2002268663 A | 9/2002 |
| JP | 2003110895 A | 4/2003 |
| TW | 200607340 | 2/2006 |
| WO | 0067960 A1 | 11/2000 |

\* cited by examiner

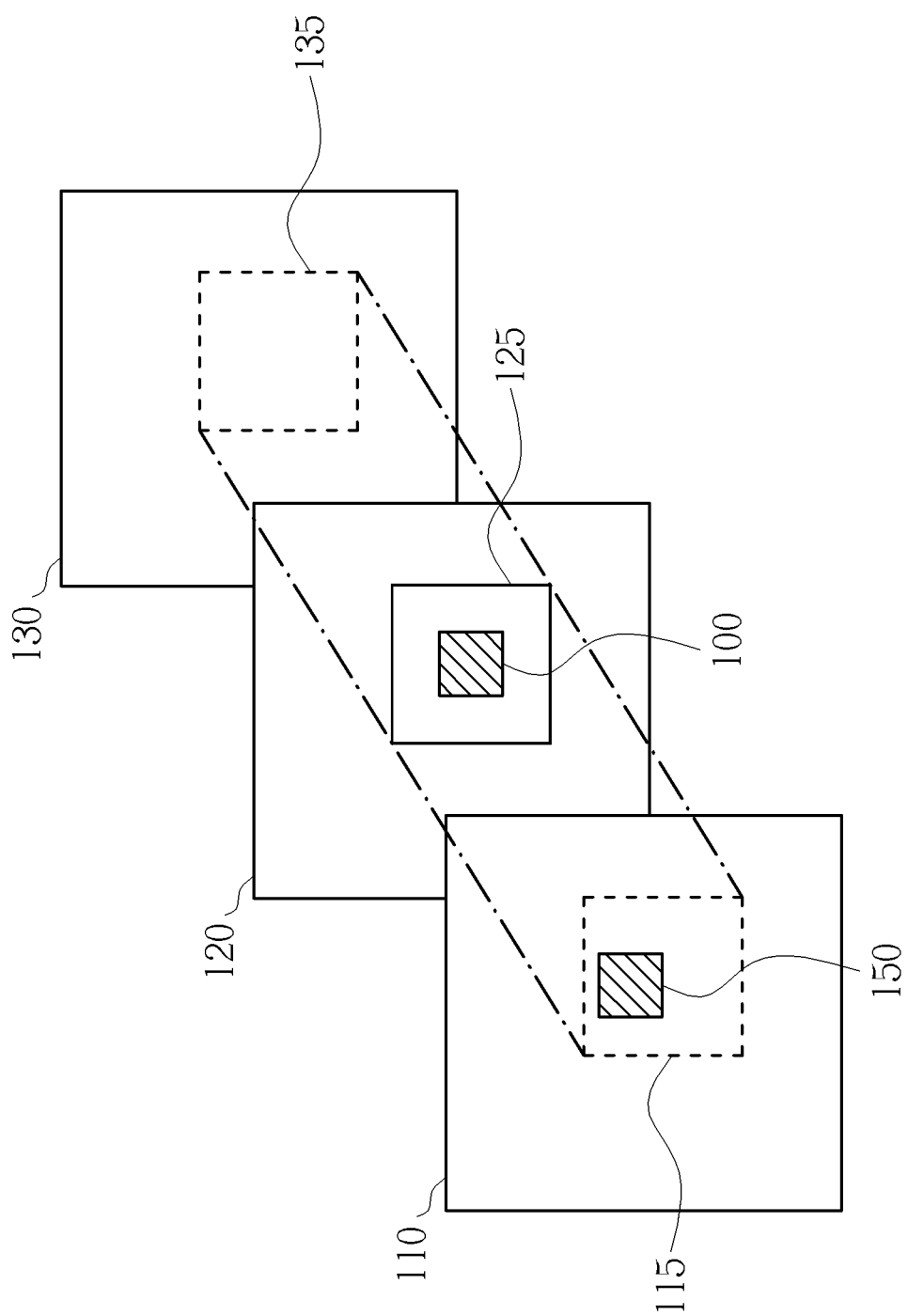

US 8,760,390 B2

INTERACTIVE DEVICE CAPABLE OF IMPROVING IMAGE PROCESSING

CROSS REFERENCE TO RELATED APPLICATIONS

This application is a continuation of applicant's earlier application, Ser. No. 10/904,301, filed Nov. 3, 2004, which is hereby incorporated by reference in its entirety.

BACKGROUND OF THE INVENTION

1. Field of the Invention

The present invention relates to an interactive device, and more specifically, to an interactive device capable of improving image processing.

2. Description of the Prior Art

With the popularization of multimedia applications, conventional image sensors installed within digital devices, such as digital video camcorders and digital still cameras (DSC), are used for taking moving images. Generally speaking, image sensors with higher resolutions are able to produce high quality digital images, and thus can be used for image distinguishing and fingerprint identification purposes. Image sensors with lower resolution, however, are used in interactive toys for simple motion distinguishing purposes. Take mechanical pets for example; the built-in camera installed inside the mechanical pets functions as an "eye" of the interactive toy to sense users' motion and then indicate different instructions through a control circuit.

Please refer to FIG. 1. FIG. 1 is a functional block diagram of an interactive device 10 according to the prior art. The interactive device 10 includes an image sensor 12, a micro-controller 14, and a parallel transmission bus 16. The image sensor 12 contains a CMOS sensing array 22 and an analog to digital converter (ADC) 24. Data sensed by the CMOS sensing array 22 is transmitted to the analog to digital converter 24. Because the CMOS sensing array 22 is capable of sensing a plurality of pixel data for forming images, the CMOS sensing array 22 of the image sensor 12 will generate various pixel data continuously while taking continuously moving images. In order to transmit a considerable amount of pixel data, the sensed pixel data between the image sensor 12 and the controller 14 are transmitted through a parallel transmission bus 16, and then the micro-controller 14 recomposes the object images or determines the condition of the object based on the above pixel data to control the operation of the interactive device 10.

The huge amount of the sensed data is considerable, however, and the velocity of parallel transmission with complex hardware structures is slower than that of serial transmission with the high development of serial transmission. Furthermore, the micro-controller 14 still has to determine and analyze the necessary data after receiving the sensed data transmitted through the parallel transmission interface. Because the applied sphere of each micro-controller 14 is not consistent, taking the micro-controller installed within an optical mouse as an example, the micro-controller 14 does not need to obtain entire and detailed image data, but can instead obtain just the trail of relatively moving positions of image objects. As a result, if users utilize the conventional image sensor 12 for generating pixel data, the micro-controller 14 has to receive and process all pixel data, resulting in a major burden while processing the image data.

Moreover, the traditional image sensor 12 for transforming received light into electrical signals is implemented as a single chip. Therefore, it is necessary to improve such image sensor 12 made as a single chip using the trend of system-on-chip circuit design.

SUMMARY OF THE INVENTION

It is therefore a primary objective of the claimed invention to provide an interactive device that calculates the desired image parameters in advance using a chip which integrates image processing circuits and an image sensor onto the same substrate and then transmits the parameters to the control circuit to reduce the complexity of the design of the control circuit and to speed up image processing.

According to the claimed invention, an interactive device capable of improving image processing includes a processing module and a controller. The processing module includes a substrate, an image sensor formed on the substrate for generating a plurality of pixel signals, and a calculation unit formed on the substrate for calculating at least one motion vector based on the plurality of pixel signals, the motion vector being calculated as a motion difference between a reference object and a target object, the target object being a set of pixel signals in a target image picture, and the reference object being an object in a searching area of a previous image picture or a following image picture with respect to the target image picture that has a size similar to that of the target object and that has the smallest difference with respect to the target object. The processing module also includes a transmission interface formed on the substrate for serially outputting the motion vector. The controller is used for controlling operation of the interactive device based on the motion vector output by the transmission interface.

According to the claimed invention, the static image parameters indicate measurable parameters while the image objects are being statically displayed. For instance, the static parameter comprises one or more parameters from a group consisting of a coordinate of an image object, an area of an image object, a direction indicating an image object, a color parameter of an image object, object points of an image object, a length to width ratio of an image object, and a boundary parameter of an image object.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows multiple image pictures.

DETAILED DESCRIPTION

Figure 1:
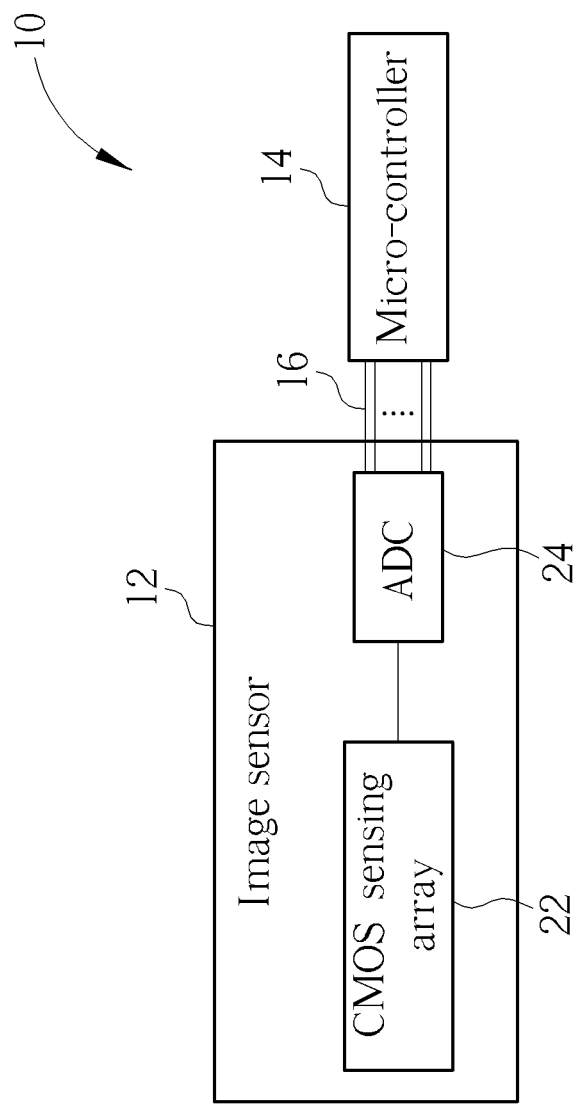
FIG. 1 is a functional block diagram of the interactive device according to the prior art.
Figure 2:
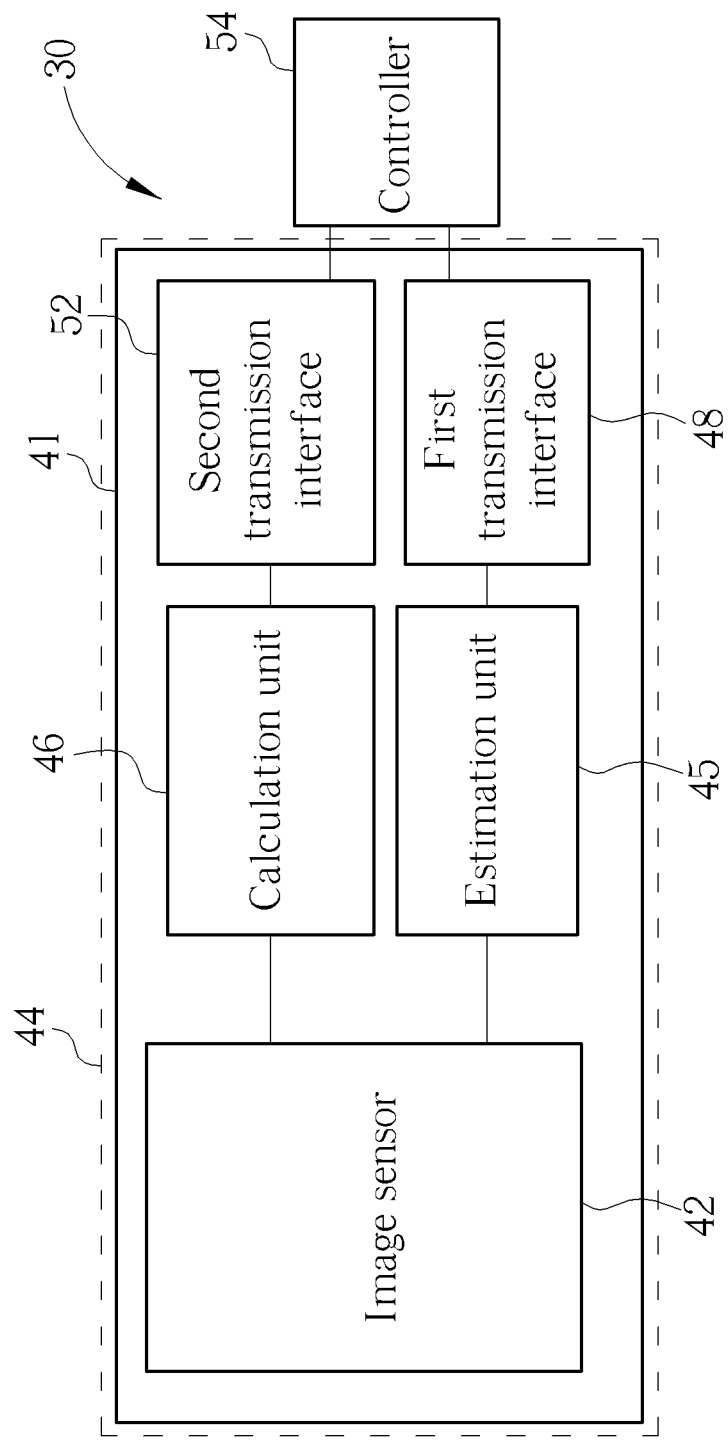
FIG. 2 is a functional block diagram of the interactive device according to the present invention.

Please refer to FIG. 2. FIG. 2 is a functional block diagram of the interactive device 30 according to the present invention. The interactive device 30 can be a mouse or an interactive toy. The interactive device 30 contains a processing module 44 that is a chip and a control circuit 46. The processing module 44 includes an image sensor 42, which is a charge-coupled device (CCD) or a CMOS optical sensor, for generating a plurality of digital pixel signals, and then transmitting the plurality of pixel signals to the processing module 44. The processing module 44 comprises a substrate 41, an estimation unit 45, a calculation unit 46, and transmission interfaces 48, 52. The image sensor 42, the estimation unit 45, the calculation unit 46, and the transmission interfaces 48, 52 are all formed on the substrate 41.

Please refer to FIG. 3. FIG. 3 shows multiple image pictures. Each picture comprises a plurality of pixel signals. Take the picture of 800*600 pixels for example. The image sensor 42 is used to generate a plurality of pixel signals. After the plurality of generated pixel signals are transmitted to the estimation unit 45, the estimation unit 45 will determine various parameters of each image based on a plurality of pixel signals. Take the target picture 120 for example, the display condition of the target object 100 in the target picture 120 is determined by several image parameters, such as coordinates of the target object 100, an area of the target object 100, color of the target object 100, orientation of the target object 100, the boundaries of the target object 100, ends of the target object 100, and the length to width ratio of the target object 100 in the target picture 120.

The target object 100 is taken as a set of the pixel signals with an identical color parameter, and the estimation unit 45 is capable of determining parameters of the target object1 100 in the target picture 120, (e.g. an area, orientation, boundary, and gray-scale value), based on the number of identical pixel signals and their corresponding coordinates. The estimation unit 45 also determines parameters such as object ends and the object's length to width ratio. For example, providing that the target object 100 is a rectangle, the estimation unit 45 is able to determine the number of the object ends is 4 and the rectangle object's length to width ratio. That is to say, the static image pixel parameters are the measurable parameters of the target object 100 while the target object 100 is being statically displayed.

Furthermore, video film is actually a continuous series of pictures, which are perceived as a moving picture due to the persistence of vision of human eyes. Since the time interval between pictures is very short, the difference between neighboring pictures is generally little and mostly appears in change of location of visual objects. While displaying a video film, in theory, a plurality of pixel signals must be re-composed as a picture again and again to show a continuous video image. In general, there are some spatial similarities in chromatic, geometrical, or other characteristic values within a picture/image. In order to eliminate these spatial redundancies, it is required to identify significant elements of the picture and to remove the redundant elements that are less significant. Please keep referring to FIG. 3. The target picture 120 is separated into a plurality of objects, and the size of each object is free. Every object in the target picture 120 is encoded based on a difference to one object in the previous picture 110 in the time axis or a difference to one object in the following picture 130. In contrast to the target object 100, all contrasted objects with similar size in a searching area 115 of the previous picture 110 or the objects with similar size in a searching area 135 of the previous picture 130 will be contrasted one by one. In FIG. 3, compared with all contrast objects in the previous picture 110 and in the following picture 130, the object having the smallest difference with respect to the target object 100 serves as a reference object 150. The motion difference between the reference object 150 and the target object 100 indicates the motion vector. The calculation unit 46 is able to determine the motion vector among each object in above-mentioned way.

After obtaining related parameters for each picture, the estimation unit 45 and the calculation unit 46 transmit the parameters to the transmission interfaces 48, 52. The transmission interfaces 48, 52 can be a universal asynchronous receiver/transmitter (UART) interface. Compared with synchronous parallel transmission, asynchronous serial transmission has the advantages of small volume, low price, and the ability to transmit over a long distance. For instance, a universal asynchronous transceiver is an asynchronous serial/parallel data transmitter for transmitting data between serial devices that control and connect to the interactive device 30 (or a processor). More specifically, the function of the interactive device 30 provided by UART is similar to that of data exchange provided by RS-232 data terminal equipment (DTE), so that the interactive device 30 is capable of exchanging data with serial devices through a universal serial bus (USB).

In addition to the UART mentioned previously (RS-232 is one kind of UART), the transmission interfaces 48, 52 can be I$^2$C (inter-IC) or USB interfaces. The I$^2$C protocol regulates that data transmission is performed through two two-way (transmit and receive) transmission lines (serial data line SDA and serial clock line). Because the principle of transforming serial data and parallel data with I$^2$C and USB is similar to that with UART and is well known to those skilled in the art, there will be no further description hereinafter.

In other words, the first transmission interface 48 and the second transmission interface 52 can each use at least one kind of interface from the serial transmission groups including the UART, I$^2$C (inter-IC), and USB interfaces.

Ultimately, after receiving the motion vectors or the static parameters (e.g. coordinates of an object, an area of an object, color of a object, orientation of an object, boundary of an object, object ends, and length to width ratio of an object) transmitted from the transmission interfaces 48, 52, the control circuit 54 is able to utilize codes of each object in the previous picture 110 in cooperation with motion vectors and static parameters of each object to recover the target picture 120. The control circuit 54 may take further action based on the parameters for controlling the operation of the interactive device 30.

In another embodiment, the first transmission interface 48 for transmitting the data generated by the estimation unit 45 and the second transmission interface 52 for transmitting the motion vectors calculated by the calculation unit 46 can be combined into a single interface.

As far as an optical mouse (acting as an interface device) is concerned, because an optical mouse is simply a cursor control device, the moving trace of a cursor (regarded as an object) is more important. Under this circumstance, it is not necessary to take much notice on the parameters of image objects determined by the estimation unit 45, such as an area of an object and orientation of an object because the motion vectors determined by the calculation unit 46. In consequence, in the third embodiment, the processing module 44 comprises the image sensor 42, the calculation unit 46, and the second transmission interface 52, and all are formed on the substrate 41. Thus, the third embodiment does not make use of the calculation unit 46 and the second transmission interface 52.

In the fourth embodiment, the image sensor 42, the estimation unit 45, and the first transmission interface 48 are formed on the same substrate 41, and the calculation unit 46 and the second transmission interface 52 are not used.

Compared with the prior art, the present invention processing module 44 integrates the image sensor 42, the estimation unit 45, the calculation unit 46, and the transmission interfaces 48, 52 on the same substrate 41 as a single chip. The estimation unit 45 is able to determine the coordinates of a plurality of pixel signals, and calculates image parameters, such as an area of each object, boundary of each object, orientation of each object, and color of each object, based on the pixel coordinates. The calculation unit 46 can calculate motion vectors based on the plurality of pixel signals transmitted from the image sensor 42 in advance. At the same time, the transmission interfaces 48, 52 transmit the calculated image parameters by a UART interface or any other serial transmission interfaces. In this way, the control circuit 54 at the back end does not need to calculate complicated parameters any more, which reduces the circuit design complexity and shortens the development period of interactive devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interactive device capable of improving image processing comprising:
   a processing module comprising:
      an image sensor generating a plurality of pixel signals;
      a calculation unit calculating at least one motion vector based on the plurality of pixel signals, wherein the motion vector is calculated as a motion difference between static parameters of a reference object and static parameters of a target object, the static parameters of the reference object being measured parameters of the reference object when the reference object is being statically displayed, and the static parameters of the target object being measured parameters of the target object when the target object is being statically displayed, the target object includes significant elements as a set of pixels within a target image picture having pixel signals in the target image picture, the target object having a plurality of pixels and representing a subset of pixels within the target image picture, and the reference object is an object in a searching area of a previous image picture or a following image picture with respect to the target image picture that has a size similar to that of the target object and that has the smallest difference with respect to the target object, wherein the static parameters of an image object comprise one or more parameters selected from a group consisting of a coordinate of the image object, an area of the image object, a direction indicating the image object, a color parameter of the image object, object points of the image object, a length to width ratio of the image object, and a boundary parameter of the image object, the image object being the reference object or the target object; and
      a transmission interface serially outputting a control signal based on the motion vector; and
   a controller for controlling operation of the interactive device based on the control signal.

2. The interactive device of the claim 1 wherein the transmission interface is a universal asynchronous receiver/transmitter (UART).

3. The interactive device of the claim 1 wherein the transmission interface is $I^2C$ interface.

4. The interactive device of the claim 1 wherein the image sensor is a CMOS sensor.

5. The interactive device of the claim 1 wherein the image sensor is a charge-coupled device (CCD).

6. An interactive device capable of improving image processing comprising:
   a processing module comprising:
      an image sensor generating a plurality of pixel signals;
      a calculation unit calculating at least one motion vector based on the plurality of pixel signals, wherein the motion vector is calculated as a motion difference between static parameters of a reference object and static parameters of a target object, the static parameters of the reference object being measured parameters of the reference object when the reference object is being statically displayed, and the static parameters of the target object being measured parameters of the target object when the target object is being statically displayed, the target object includes significant elements as a set of pixels within a target image picture having pixel signals in the target image picture, the target object having a plurality of pixels and representing a subset of pixels within the target image picture, and the reference object is an object in a searching area of a previous image picture or a following image picture with respect to the target image picture that has a size similar to that of the target object and that has the smallest difference with respect to the target object, wherein the static parameters of the target object comprise one or more parameters selected from a group consisting of a coordinate of the target object, an area of the target object, a direction indicating the target object, a color parameter of the target object, object points of the target object, a length to width ratio of the target object, and a boundary parameter of the target object; and
      a transmission interface serially outputting a control signal based on the motion vector; and
   a controller for controlling operation of the interactive device based on the control signal.

* * * * *